BINARY DIVISION APPARATUS

Filed Dec. 27, 1961 5 Sheets-Sheet 1

INVENTOR
CHARLES R. HOLLERAN
BY [signature]
ATTORNEY

BINARY DIVISION APPARATUS

Filed Dec. 27, 1961

5 Sheets-Sheet 2

Dec. 14, 1965 C. R. HOLLERAN 3,223,831

BINARY DIVISION APPARATUS

Filed Dec. 27, 1961 5 Sheets-Sheet 3

TIMING SOURCE

Dec. 14, 1965 C. R. HOLLERAN 3,223,831

BINARY DIVISION APPARATUS

Filed Dec. 27, 1961 5 Sheets-Sheet 5

3,223,831
BINARY DIVISION APPARATUS

Charles R. Holleran, Ann Arbor, Mich., assignor to International Business Machines Corporation, New York, N.Y., a corporation of New York Filed Dec. 27, 1961, Ser. No. 162,503
5 Claims. (Cl. 235—164)

This invention relates to electronic circuitry. More particularly, this invention relates to apparatus for performing binary division in which two quotient bits are generated after each reduction.

In the prior art, binary division is most often performed by successive subtraction of the divisor from the dividend. For each subtraction a single quotient bit is generated. Apparatus for performing binary division in this manner includes an adder, a register and two shiftable registers. See, for example, Patent No. 2,974,866, issued March 14, 1961, "Electronic Data Processing Machine," J. A. Haddad et al., assigned to the International Business Machines Corporation, which discloses binary division apparatus comprising an adder, a memory register, a shiftable accumulator register and a shiftable multiplier/quotient register. The two shiftable regitsers act, in division, as one double-length shiftable register. The divisor is initially placed in the memory register and the dividend is initially placed in the accumulator register. The divisor is repeatedly subtracted from the contents of the accumulator register, the result of each subtraction being placed into the accumulator register. One bit of the quotient, developed as a function of each subtraction, is placed into the multiplier/quotient register. After each subtraction, the accumulator register and multiplier/quotient register are shifted left one position. Since the number of shifts per reduction is fixed at one, inexpensive fixed-shift registers may be used.

The binary division apparatus described in the Haddad et al. patent requires at least one reduction (subtraction and shifting) operation for each quotient bit developed.

A number of faster binary division schemes are described in the January 1961 Proceedings of the IRE, pages 67–91, in an article by O. L. McSorley entitled "High-Speed Arithmetic in Binary Computers." These methods utilize apparatus for examining a number of dividend bits at a time and generating, as a function of the examination, a factor of the divisor which is used in place of the divisor during the reduction operation. A number of bits of the quotient (the actual number changing with the value of the dividend bits examined) are generated for each subtraction (or addition). After each subtractiton a number of shifts (the actual number of shifts also being dependent upon the value of the dividend bits examined) are taken.

The binary division apparatus described in the McSorley article permits more than one quotient bit to be generated for each reduction operation. However, this increase in speed over the apparatus disclosed in the Haddad et al. patent is obtained by resort to expensive variable-shift registers. A relatively inexpensive fixed-shift register cannot be used, since the number of shifts performed varies from one reduction operation to the next.

Binary division apparatus utilizing a fixed-shift register in which a plurality of quotient bits are generated for each reduction cycle is described in "Reducing Computing Time for Synchronous Binary Division," Roy G. Saltman, pages 169–174, IRE Transactions on Electronic Computers, EC–10 No. 2, June 1961. In this apparatus three different factors of the divisor are each subtracted from (or added to) a multiple of the dividend, and the results (of two) stored in registers. One of the stored results is selected, for the next reduction operation, as a function of sign-changes during the previous reduction. The quotient is developed two bits at a time in a quotient register which is shifted two positions after each reduction. This scheme requires three adders and four registers, one of which is capable of fixed-shift operation.

The binary division apparatus described in the Saltman article permits more than one quotient bit to be generated for each reduction operation, without the necessity of expensive variable-shift registers. This scheme approaches the speed of the apparatus described in the McSorley article while maintaining the relatively inexpensive fixed-shift register used in the apparatus disclosed in the Haddad et al. patent. However, the scheme described by Saltman requires one register and two adders more than those disclosed in the Haddad et al. patent and thus is considerably more expensive.

It is therefore an object of this invention to provide apparatus for performing binary division more rapidly than was heretofore possible without proportionally increasing the quantity and the cost of the components required.

Another object of this invention is to improve prior art binary division apparatus so as to increase the speed at which binary division is performed without a corresponding increase in cost.

A further object of this invention is to provide improved binary division apparatus capable of generating a fixed plurality of quotient bits for each reduction operation.

An additional object of this invention is to permit, in binary division apparatus comprising registers including fixed-shift registers, the generation of a plurality of quotient bits per reduction.

Another object of this invention is to provide binary division apparatus comprising an adder, two registers and two fixed-shift registers, for generating two quotient bits per reduction cycle.

The foregoing and other objects, features and advantages of the invention will be apparent from the following more particular description of the preferred embodiment of the invention, as illustrated in the accompanying drawings.

The objects of this invention are attained by apparatus comprising an adder, a source of divisor factors and a fixed-shift register. The dividend is initially placed in a high order part of the register and the quotient is developed, a plurality of bits at a time, in a low order part of the register.

A plurality of the highest order dividend bits are examined at the beginning of each reduction operation. As a function of the value of these bits, the value of the divisor and the results of the previous reduction, a divisor factor is selected from those available. The selected divisor factor and the contents of the high order part of the register are combined in the adder and the result replaces the previous contents of the high order part of the register. The entire register is shifted toward the higher orders a fixed plurality of times. A plurality of quotient bits, generated as a function of the divisor factor selected and the reduction results, are entered into the lowest order positions of the register. The next reduction operation is then taken.

The fixed plurality of shifts taken during each reduction equals the fixed plurality of quotient bits generated, and is the same for each reduction. Thus, the quotient is developed a fixed plurality of bits at a time in the low order part of the register.

The number of factors of the divisor and their values are a function of the number of dividend bits examined and the number of quotient bits to be generated for each reduction. The number and value of the factors increases if the number of quotient bits to be generated is increased.

In the drawings:

FIGURE 1*a* is a block diagram showing a data processing system utilizing the invention.

FIG. 1*b* is a block diagram showing the data circuitry of the invention.

FIGS. 2 through 7 are block diagrams of the controls necessary to operate the data circuitry of FIG. 1*b*.

FIGS. 8*a* and 8*b* illustrate the rules implemented by the control circuitry of FIGS. 2 through 7.

FIG. 9 is a pulse diagram showing signals occurring during the operation of the invention.

GENERAL DESCRIPTION

The structure and operation of the invention will now be generally described with reference to FIGS. 1*b*, 8*a* and 8*b*. Referring first to FIG. 1*b*, there is shown a source of divisor factors comprising two registers 9 and 10, three sets of AND gates 11, 12 and 13, a group of OR circuits 14 and a complementor 15. This combination of circuits acts to supply to one input of an adder 16 the positive "true" or "complement" (negative) of factors of a divisor. In this particular example of the invention the factors are chosen to be one times the divisor (1XD), two times the divisor (2XD) and three times the divisor (3XD).

There are several ways in which factors of a divisor may be obtained. The particular scheme shown in FIG. 1*b* assumes the availability on a cable 110 of one times the divisor and three times the divisor. If the 1XD factor is desired it is gated to the adder through the AND gates 12. If the 3XD factor is desired it is gated through the AND gates 13. If the 2XD factor is desired it is gated through the AND gates 11 which shift the 1XD factor one position to the left relative to the register 9 during the transfer. The effect of a left shift during transfer is to double the factor being transferred. Therefore, the 1XD factor is entered into the adder 16 as a 2XD factor. If the factor to be entered into the adder 16 is desired to be in the true positive form it will pass through the complementor 15 without change. If the complement of a factor is desired, the complementor 15 is operated to supply the complement or negative of the factor to the adder. The complementor 15 shown supplies the one's complement. The desired two's complement is obtained by adding a one into adder 16 low order position 0.

A partial divider register (PDR) 18 acts as a double length accumulator. The dividend is initially stored in the partial dividend register 18 via cable 112. The high order part of the partial divided register 18 may be updated by addition of a selected factor of the divisor. This is accomplished by means of cable 116 which transfers the high order part of the partial dividend register 18 to inputs of the adder 16. The sum of the transferred contents of the partial dividend register 18 and the current selected factor of the divisor replace the transferred contents of the partial dividend register 18. After this updating or reduction operation, all the contents, including the low order part, of the partial dividend register 18 are shifted two places to the left by means of the PDR shifter 19. This is accomplished by removing all of the contents of the partial dividend register 18, transferring them at a displacement of two orders to the PDR shifter 19 and then transferring the output of the PDR shifter 19 to the partial dividend register 18 without further displacement.

After each reduction operation and during the shifting operation two bits of the quotient are generated and placed into the two lowest order positions of the dividend register 18. These are the two positions vacated as a result of the shifting operation. The quotients are developed as a function of the divisor, the dividend and the results of the reduction operation.

Still referring to FIG. 1*b*, the three high order bits N, N–1, and N–2 of the partial dividend register 18 are available for sensing. The value of the three high order bits prior to a reduction operation determines the divisor factor selected for use during the reduction operation. The values also determine what quotient bits will be generated after the reduction operation.

Referring now to FIGS. 8*a* and 8*b*, the rules used in the selection of divisor factors and the generation of quotient groups are shown. The diagram of FIG. 8*a* is used during the first reduction operation and also during subsequent reduction operations if a carry resulted during the preceding reduction. The diagram of FIG. 8*b* is used only if there was no carry during the previous reduction operation. It is a rule that all high order zero bits of the divisor are to be ignored, that is, the divisor is to be normalized. Therefore, for any particular binary division problem only the upper, or the lower, horizontal line of FIGS. 8*a* and 8*b* will be used. Prior to a reduction operation the value of the highest order three bits in the partial dividend register 18 will therefore uniquely define a divisor factor to be used. For example, during a first reduction operation where the two high order one bits of the divisor are 11 and the three high order bits of the dividend are 011, FIG. 8*a* indicates that the –2XD factor will be used. If during the reduction operation a high order carry occurs in the adder 16 the quotient bits 10 will be generated. If no carry results in the quotient bits 01 will be generated.

The operation of the invention will be generally described with reference to the problem illustrated in the following table.

*Table*

| | | |
|---|---|---|
| Load Dividend into PDR 18 | | 0 1 0 1 1 1 0 0 0 0 0 0 0 0 0 0 |
| Load 1XD (Normalized) into 9 | | 1 1 0 0 0 1 |
| Load 3XD into 10 | | 1 0 0 1 0 0 1 1 |
| Selected–2XD | | 1 0 0 1 1 1 1 0 |
| Add (No carry results) | | 1 1 1 1 1 0 1 0 0 0 0 0 0 0 0 0 |
| Shift PDR 18 and Generate Quotient (01). | | 1 1 1 0 1 0 0 0 0 0 0 0 0 0 0 1 |
| Select+1XD | | 1 1 0 0 0 1 |
| Add (A carry results) | (1) | 0 0 0 1 1 0 0 1 0 0 0 0 0 0 0 1 |
| Shift PDR and Generate Quotient (11). | | 0 1 1 0 0 1 0 0 0 0 0 0 0 1 1 1 |
| Select–2XD | | 1 0 0 1 1 1 1 0 |
| Add (A carry results) | (1) | 0 0 0 0 0 0 1 0 0 0 0 0 0 1 1 1 |
| Shift PDR and Generate Quotient (10). | | 0 0 0 0 1 0 0 0 0 0 0 1 1 1 1 0 |
| Select–1XD | | 1 1 0,0 1 1 1 1 |
| Add (No carry results) | | 1 1 0 1 0 1 1 1 0 0 0 1 1 1 1 0 |
| Shift PDR and Generate Quotient (00). | | 0 1 0 1 1 1 0 0 0 1 1 1 1 0 0 0 |
| Result to Memory 1 | | 0 1 1 1 1 0 0 0 |

The problem is the division of the dividend number 23 (binary number 010111.0) by the divisor decimal number 49 (binary number 110001.0). The dividend is initially loaded into the partial dividend register 18, the highest order bit of the binary number being placed in position N of the register and lower order bits being placed in successive lower order positions. Similarly, the +1XD factor is placed into the register 9 and the +3XD factor is placed into the register 10. Note that the +1XD register 9 has two less positions in the higher order than does the +3XD register 10, since obviously the 3X divisor must be larger than the 1X divisor.

The three high order bits of the dividend are examined and found to be 010. Referring to FIG. 8*a*, the –2XD factor is generated and added to the contents of the partial dividend register 18 in the adder 16. No carry results from this operation. As a result, the quotient portion 01 is generated and is placed into the low order bit positions of the partial dividend register 18 during the subsequent shifting of the partial dividend register 18 contents.

The three high order bits of the partial dividend register are again examined and found to be 111 causing the +1XD factor to be selected in accordance with FIG. 8*b*. The addition of this factor to the contents of the partial dividend register 18 (the quotient bits are in the part of the register which is not sent to the adder) results in a carry from the adder 16. Therefore, the quotient bits 11 are generated and sent to the two low order bit positions of the partial dividend register 18 during the subsequent shift operation. Note that the four low order positions of the partial dividend register now contain the quotient 0111 developed to this point.

The three low order positions of the partial dividend register 18 are again examined and found to be 011, causing generation of the −2XD factor in accordance with FIG. 8*a*. A carry results during the reduction operation, the two quotient bits 10 being generated as a result and placed into the two low order bit positions of the partial dividend register 18 during the subsequent shift operation.

The three high order bit positions of the partial dividend register 18 are again examined and found to be 000. The −1XD factor is used during the reduction operation, no carry resulting. Therefore, the two low order bit positions of the partial dividend register 18 are filled with quotient bits 00 during the subsequent shift operation. The eight low order bit positions of the partial dividend register 18 now contain the number 01111000 which represents the quotient developed.

The quotient developed to this point is interpreted as the binary number 0.01111000 which is the same as the decimal number $^{30}/_{64}$ or approximately .47.

DETAILED DESCRIPTION

Figure 1A:
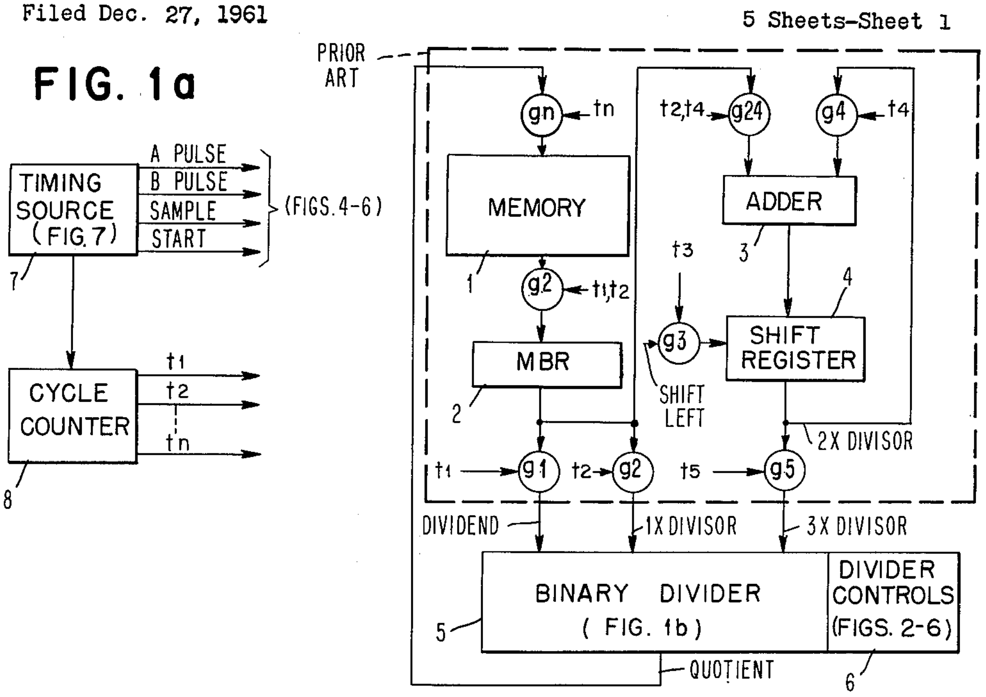

Referring first to FIG. 1*a*, the data processing system utilizing the invention is shown. The particular data processing system is not essential to the invention and is meant to be illustrative only. The system comprises a memory 1, a memory buffer register (MBR) 2, an adder 3, a shift register 4, a timing source 7, a cycle counter 8 and a binary divider 5 and divider controls 6 to be explained in more detail below. As will be obvious from the following description, the memory buffer register 2, the adder 3 and the shift register 4 may be used as components in the binary divider 5. Duplication of these components in the binary divider 5 is shown only to simplify the explanation.

Figure 7:
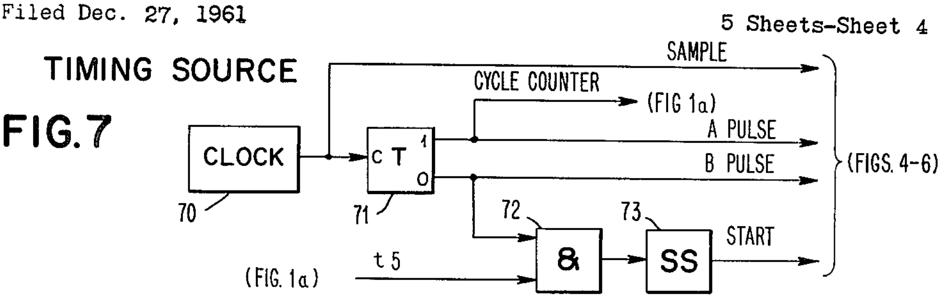
Figure 9:
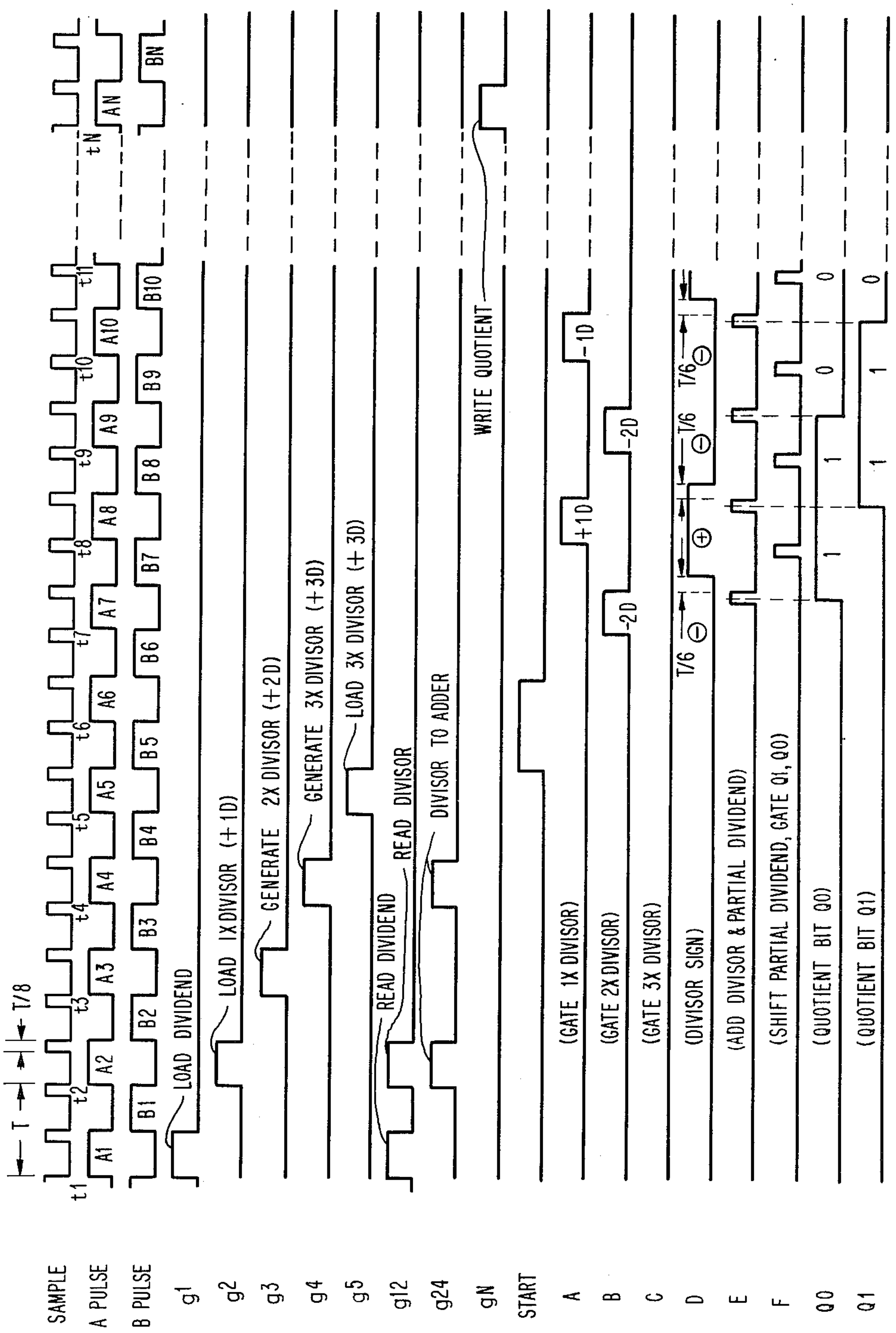

The timing source 7 generates a sequence of alternating pulses on the lines labeled A pulse and B pulse. A sample pulse, which is ¼ the size of either an A pulse or a B pulse, occurs immediately preceding the end of both an A pulse and a B pulse. Referring to FIG. 9, the relationship of the sample, A pulse, and B pulse is shown. The cycle counter 8 counts the number of complete cycles, which comprise an A pulse a nd a B pulse. The outputs of the cycle counter are used to operate gates in the data processing system. Referring to FIG. 7, the circuitry of the timing source 7 is shown in detail. A clock 70 generates the sample pulses which are supplied also to the complement (C), or reversing, input of a trigger 71. Thus, the fall of each sample pulse causes a signal to shift from the A pulse line to the B pulse line or vice versa. The A pulses are sent to the cycle counter 8 of FIG. 1*a* which keeps track of the number of cycles completed. Cycle counter 8 will, after four complete cycles, cause a signal to appear on line *t5* which signal is aplied to the AND circuit 72. The B pulse following the fifth A pulse causes the single shot multivibrator 73 to be set to the on position initiating a start pulse. The duration of the start pulse is determined by the period of the single shot multivibrator 73. With reference to FIG. 9, it can be seen that the single shot multivibrator 73 remains on for one cycle.

Referring again to FIG. 1*a*, the memory 1 has addressable locations for storing data including a dividend and a divisor. Provision is also made in the memory 1 for storing a quotient, and a remainder if any, resulting from division of the dividend by the divisor. One operand at a time may be read out of the memory 1 into the memory buffer register 2 through the gate *g2* which is operated during the first A pulse and the second A pulse, signals occurring at those times on outputs *t1* and *t2* of the cycle counter 8. The contents of the memory buffer register 2 may be sent to the binary divider via either the gate *g1*, which is operated at time *t1*, or the gate *g2* which is operated at time *t2*. The contents of the memory buffer register 2 may also be sent to one input of the adder 3 via gate *g24* which is operated at times *t2* and and *t4*. The output of the adder 3 is placed into a shift register 4, the contents of which may be shifted left (toward the high order positions) at time *t3* due to operation of the gate *g3*. The output of the shift register 4 is made available to another input of the adder 3 via gate *g4*, which is operated at time *t4*. The output of the shift register 4 may also be made available to the binary divider 5 via the gate *g5* which is operated at time *t5*. Results from the binary divider 5 are made available for writing into the memory 1 via gate *gn* at time *tN*.

Figure 1B:
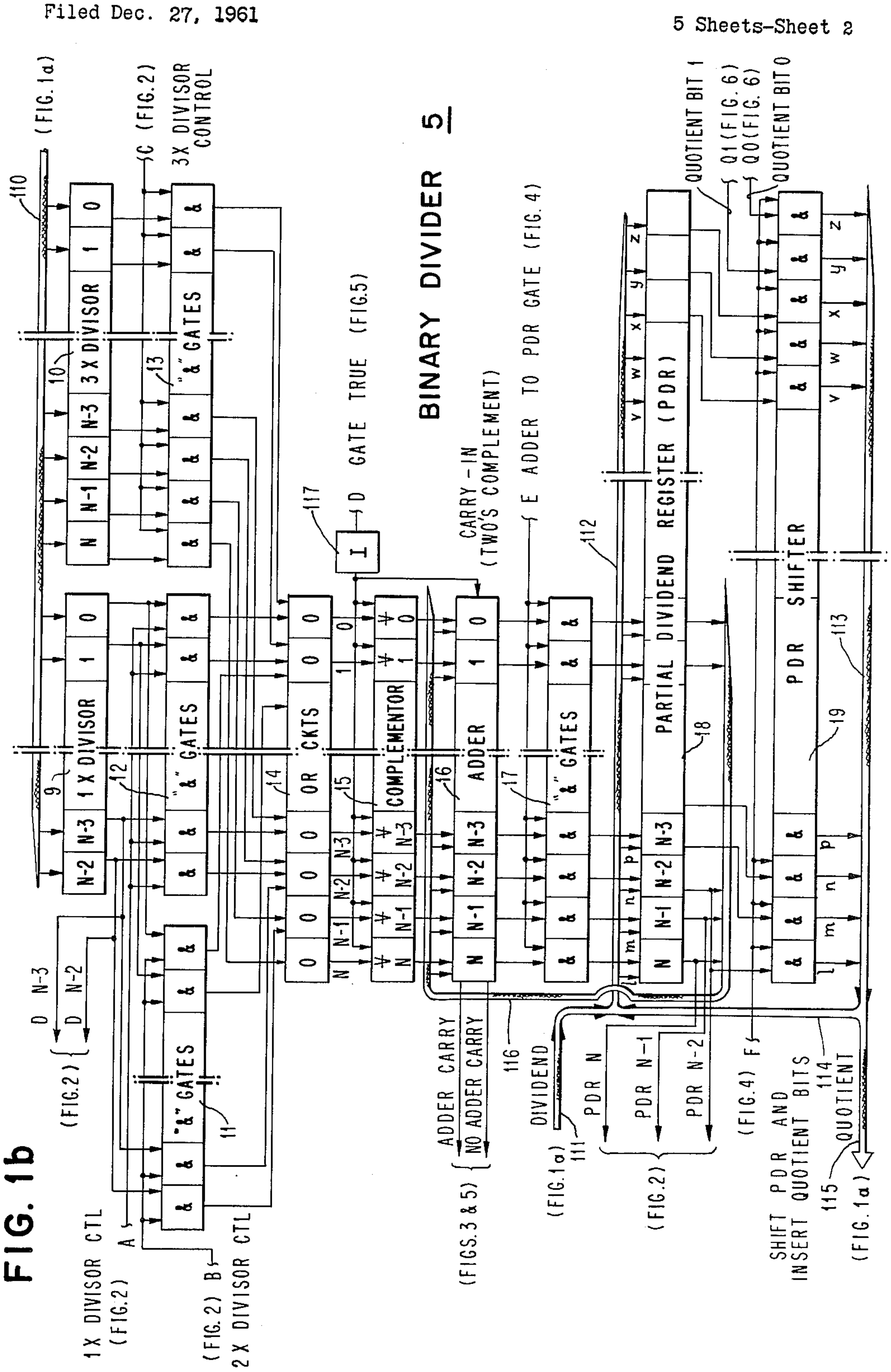

Referring to FIG. 1*b*, a detailed logic diagram of the block 5 in FIG. 1*a* is shown. The output of gate *g1* in FIG. 1*a* enters FIG. 1*b* on cable 111. The output of gate *g2* in FIG. 1*a* enters FIG. 1*b* on cable 110 to the register 9 and the output of gate *g5* in FIG. 1*a* enters FIG. 1*b* on cable 100 to the register 10. The cable 115 in FIG. 1*b* connects to the gate *gn* in FIG. 1*a*.

The register 9 receives the orders of the divisor read from the memory 1 via the memory buffer register 2. This register is a standard combination of bistable devices well known in the art. Data available at the top input from cable 110 is subsequently available at bottom outputs until replaced by new information. Each position of the register from 0 through N–2 receives one binary bit of information, either a zero or a one. The register 10 is similar in construction to the register 9 with the exception that since it must receive a larger number it has two extra high order bit positions N and N–1. The register 10 is filled with a third multiple of the divisor which is developed by the adder 3 and the shift register 4, in a manner which will be described with reference to the operation of the invention below.

Three sets of AND gates 11, 12 and 13 and a set of OR circuits 14 are used to transfer the contents of the register 9 and the register 10 to the complementor 15. The AND gates 12 are used, by placing a signal on the line A, if it is desired to transfer the contents of the register 9 to the complementor without shift in positions. Thus, if the signal was placed on the input line A, all those register 9 positions having a 1-bit will be applied to the AND gates 12 causing corresponding outputs from the AND gate outputs and inputs to corresponding ones of the OR circuits 14. As a result, the contents of the register 9 will be applied to corresponding orders of the complementor 15. The contents of the 0 order of the register 9 will be applied to the 0 order of the complementor 15, the N–2 order of the register 9 will be applied to the N–2 order of the complementor 15, etc. The AND gates and the OR circuits used herein are of standard well-known construction.

The AND gates 13 are used, by placing a signal on the input C, to transfer the contents of the register 10 to the inputs of the complementor 15 via the OR circuits 14, without change in a manner identical to that just described. Since the register 10 has two extra bit positions at the high order end, the contents of these positions will be placed into the corresponding positions of the complementor 15.

The AND gates 11 are utilized, by placing a signal at input B, if it is desired to transfer the contents of register 9 to the complementor 15 inputs with a displacement of one position toward the higher orders. The effect of displacing a binary number contained in the register 9 is to double it, thus providing a factor which is two times the divisor. The operation of the transfer via the AND gates 11 is identical to transfers via AND gates 12 and 13. Note that the output of each AND gate is applied not to the input of the corresponding order OR circuit but rather to the input of the OR circuit one order higher. As a result, the contents of the N–2 position of the register 9 are applied to the N–1 order of the complementor 15.

The complementor 15 comprises a plurality of exclusive OR circuits of any well-known kind. The inputs applied to the complementor 15 pass through to the outputs without change as long as the output of the inverter 117 remains negative. This occurs as long as there is a gate true signal at input D. If there is no signal at input D the inverter 117 output becomes positive causing all signals applied from the OR signals 14 to be inverted at the corresponding outputs of the complementor 15. This is a well-known utilization of Exclusive OR circuits as one's complementors.

The adder 16 may be of any of the many well-known binary adders used in the prior art. The output of each order is the binary sum of its inputs plus the inter-order carry if any. If there is a carry from the highest order N then there will be a signal on the line adder carry. A carry-in (one) is added into the lowest order (0) position of the adder 16, when entering a one's complement, in order to obtain a two's complement. The adder 16 is shown as a separate adder for purposes of explanation only. The adder 16 may in fact be the adder 3 in FIG. 1*a*. The outputs of the adder 16 are sampled when a signal occurs at input E of AND gates 17.

A double length partial dividend register 18 comprised of a plurality of bistable stages receives the adder output sampled by the AND gates 17. It is not necessary that the partial dividend register be exactly twice as long as the registers 9 and 10 as long as part of it has as many orders as the adder 16 and the balance of the register 18 has sufficient orders to hold the largest quotient which is to be developed. The outputs of the partial dividend register 18 positions correspond to inputs from the adder 16 and are made available to the adder 16 inputs via cable 116. The partial dividend register 18 receives inputs to all of its orders from FIG. 1*a* via the cables 111 and 112. The partial dividend register 18 may be constructed to be capable of a fixed number of shifts, in any one of a number of well-known ways. For purposes of illustration only a separate shifting circuit is shown.

The partial dividend register (PDR) shifter 19 comprises a plurality of AND circuits having their inputs connected to orders of the partial dividend register 18 which are displaced two positions to the right. Therefore, when a signal appears at input F of the PDR shifter 19, the contents of the partial dividend register 18 mill appear at the PDR shifter 19 outputs displaced two orders to the left. The outputs of the PDR shifter 19 are sent to the inputs of the partial dividend register 18 via cables 113, 114 and 112 without any displacement. As a result, the partial dividend register 18 contents are shifted two places toward the higher order each time that a signal appears at input F of the PDR shifter 19. Note that the two lower order positions of the PDR shifter 19 receives signals on input Q1 and Q0 which are also sent to the partial dividend register 18. These two bits enter the partial dividend register 18 in the two lowest order positions which are vacated as a result of the current shift. The contents of the lower order portion of the partial dividend register 18 may be sent to FIG. 1*a* for storage in the memory 1 via the PDR shifter 19 and cables 113 and 115. Three highest order positions of the partial dividend register 18 are sensed by logic, to be explained, via three lines PDR N, PDR N–1 and PDR N–2.

Figure 8A:
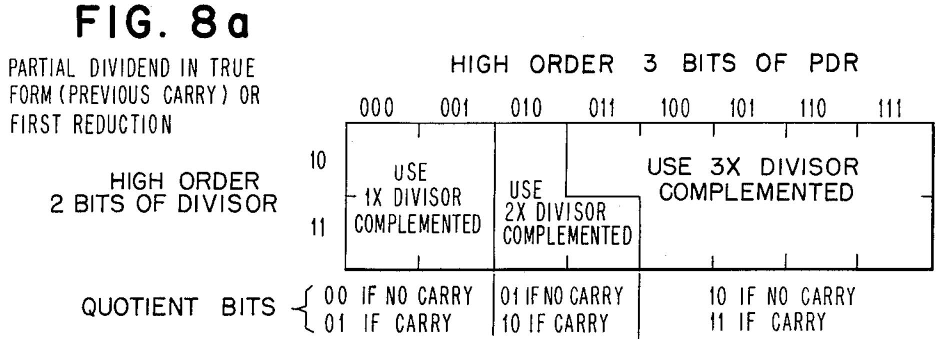
Figure 8B:
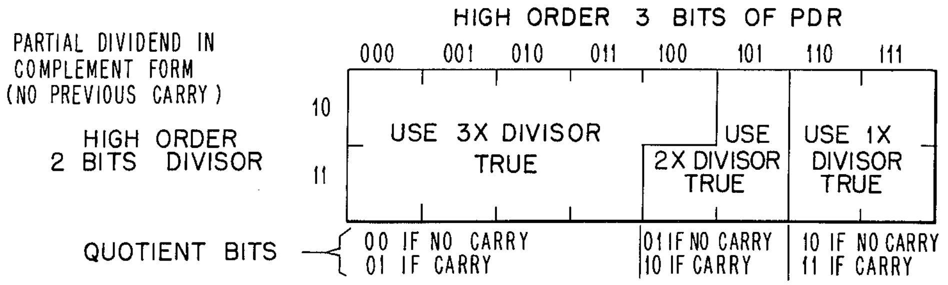
Figure 2:
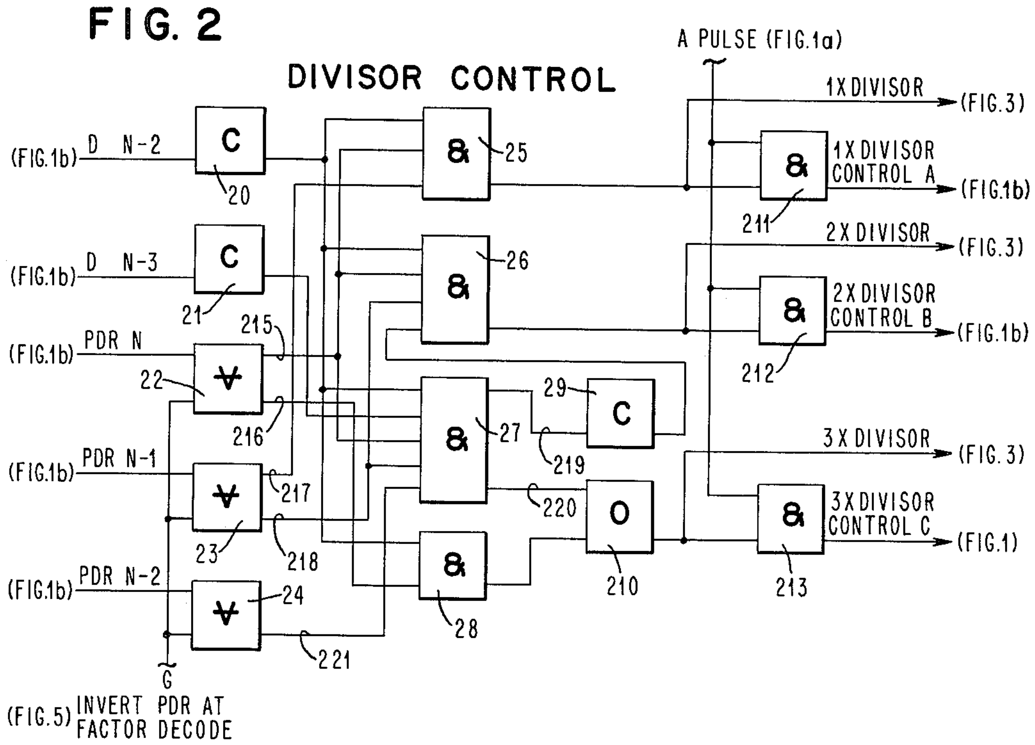

Referring now to FIG. 2, the divisor control which implements part of the tables shown in FIGS. 8*a* and 8*b* will be described. The particular divisor factor chosen (without regard to sign) is dependent upon the high order two bits of the divisor stored in the register 9 and the high order three bits of the contents of the partial dividend register 18. Therefore, these five positions are connected as inputs to the circuits of FIG. 2. The high order two bits of the divisor from the register 9 are applied at inputs D N–2 and D N–3 to convert blocks 20 and 21. The outputs of the convert blocks are identical to the inputs applied, being of standard construction. The three high order positions of the partial dividend register 18, which may be in either true or complement form depending upon the results obtained from the adder 16, are applied to three Exclusive OR blocks 22, 23 and 24. In the event that the binary values applied are in the complement form, a signal will occur at input G causing the outputs 216, 218 and 221 of the Exclusive OR blocks to be inverted as previously described with reference to the complementor 15. The outputs 215 and 217 of the Exclusive OR blocks 22 and 23 are always the complement of the corresponding lines 216 and 218. The outputs of the convert blocks 20 and 21 and the Exclusive OR blocks 22, 23 and 24 are applied to the inputs of AND circuits 25, 26, 27 and 28 which in turn are connected to convert block 29 and OR block 210 to generate signals which will supply the divisor factor required by the particular divisor and partial dividend bits examined. The AND circuits 211, 212 and 213 are operated by each A pulse from the timing source 7 to select the proper divisor factor via the AND gates 11, 12 or 13 in FIG. 1*b*. Note that the AND circuit 27 in FIG. 2 has a normal output 220 and a complement output 219. The divisor factor to be selected is, immediately upon determination prior to the occurrence of an A pulse, made available to the quotient generator, FIG. 3.

Figure 3:
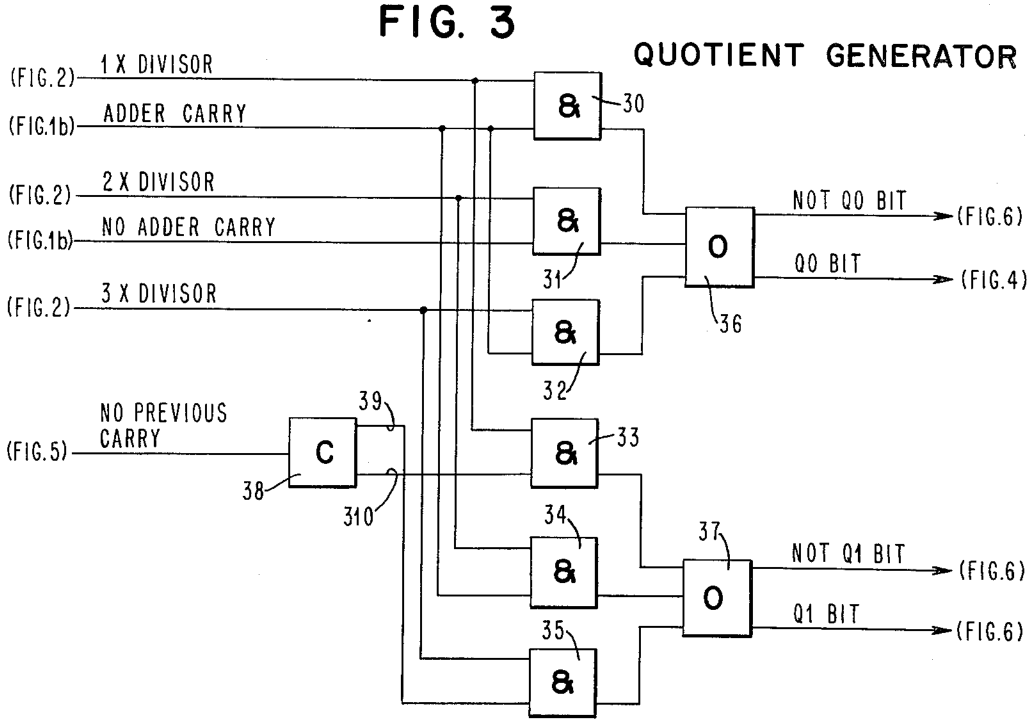

Referring now to FIG. 3 the quotient generator will be described. This circuit implements part of the table shown in FIGS. 8*a* and 8*b*. Once a particular divisor factor has been selected, which is determined by the circuity of FIG. 2, the quotient bits to be generated will depend only upon the occurrence of, or the absence of, a carry during the current reduction operation, and the occurrence of a carry during the previous reduction operation. Therefore, the inputs to the circuit of FIG. 3 comprise an indication of which divisor factor was selected on one of three lines: 1X divisor, 2X divisor and 3X divisor. If a carry results during the current reduction operation a signal will be transferred from the high order position of the adder 16, FIG. 1*b*, to the line adder carry in FIG. 3. Similarly, if there is no carry from the high order bit position of the adder 16 in the FIG. 1*b* then there will be a signal applied to the line no adder carry in FIG. 3. As will be described below with reference to FIG. 5, the occurrence of a carry during a reduction cycle is stored in a trigger 53 for interrogation during the next reduction cycle. Therefore, if no carry occurred during the previous reduction operation the trigger will be set on causing a signal on the input line no previous carry in FIG. 3 during the current reduction operation. A combination of AND circuits 30, 31, 32, 33, 34 and 35, OR circuits 36 and 37 and converted block 38 completely implement the generation of quotient bits in accordance with FIGS. 8*a* and 8*b*. For example, if there is a signal on the line no previous carry, there is a signal on the line 3X divisor, and if there is a signal on the line no adder carry, then there will be an output on the line not Q0 bit from OR circuit 36 and not Q1 bit from OR circuit 37. The operation of the balance of this circuitry is obvious with reference to FIGS. 8*a* and 8*b*. Note that the convert block 38 has a normal output 310 and a complement output 39 and that the OR circuits 30 and 37 also have normal and complement outputs, the upper outputs always being the complement of the lower outputs.

Figure 4:
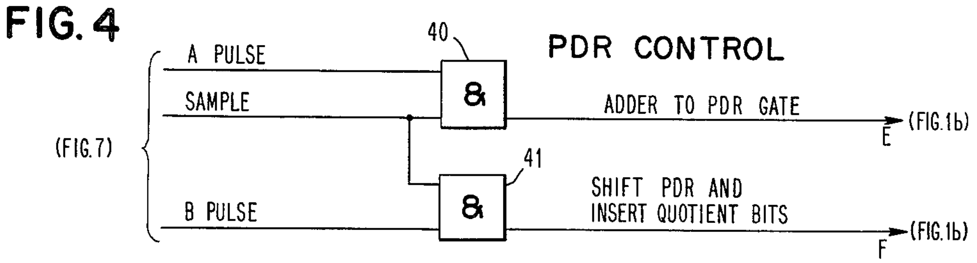

Referring now to FIG. 4, the partial dividend register control used during reduction operations is shown. Upon the coincidence of signals on the line A pulse and sample, an AND circuit 40 will emit a signal on the line adder to partial dividend register (PDR) gate. Upon the subsequent coincidence of signals on the lines sample and B pulse, an AND circuit 41 will emit a signal at output to shift partial dividend register (PDR) and insert quotient bits. Reference to FIG. 9, lines E and F indicates that every add signal at output E is followed during the current cycle by a shift and insert signal at output F. Referring to FIG. 1*b*, the occurrence of a signal at E causes AND gate 17 to be operated transferring the adder 16 outputs to the partial dividend register 18. Subsequent operation of the PDR shifter 19 by a signal F causes the contents of the partial dividend register 18 to be shifted two positions to the left. At this time also the quoient bits on lines Q1 and Q0 enter the low order positions of the partial dividend register 18.

Figure 5:
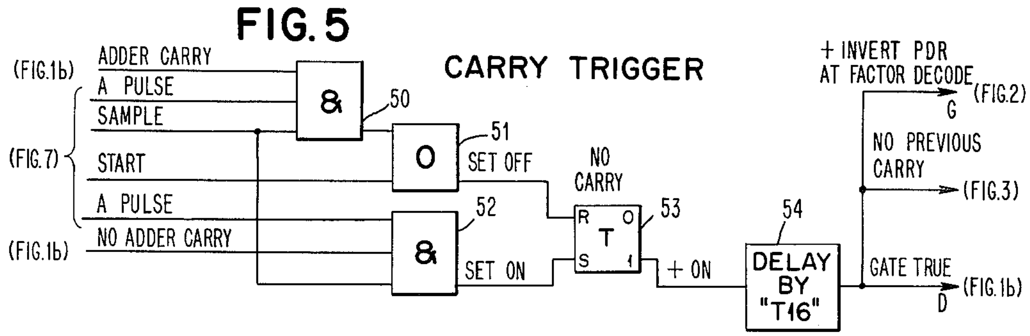

Referring now to FIG. 5, the carry trigger previously briefly mentioned with respect to FIG. 3 will now be described. The purpose of the carry trigger 53 is to record during a reduction operation whether or not a carry is emitted from the high order bit position of the adder 16 in FIG. 1*b*. The presence or absence of this carry is used by the circuitry of FIG. 3 to determine what quotient bits are to be generated during the subsequent reduction operation. The occurrence of a start signal during the first reduction operation causes the carry trigger 53 to be initially set off via OR circuit 51. Thereafter the simultaneous occurrence of an A pulse, a sample signal and an adder carry will act through the AND circuit 50 to accomplish the same result. The coincidence of an A pulse and a signal on the line no adder carry and on the line sample act through the AND circuit 52 to set the trigger 53 to the on state. When the trigger 53 is set on then, and after a delay ($T/6$) determined by the delay block 54, signals will occur on the three output lines indicated in FIG. 5. An invert PDR at factor decode signal indicates to the circuitry of FIG. 2 that the partial dividend register contents are in complement form and that the three high order bits must be inverted for use. A signal on the line no previous carry indicates to the circuitry of FIG. 3 the information necessary for operation during the next reduction period. A signal on the line gate true is applied via invert block 117 to the complementor 15 in FIG. 1*b* to pass positive divisor factors. The absence of a signal on the line gate true causes ones' complements of the factors to be passed to the adder 16 where a carry-in to the lowest order is supplied to generate the twos' complements.

Figure 6:
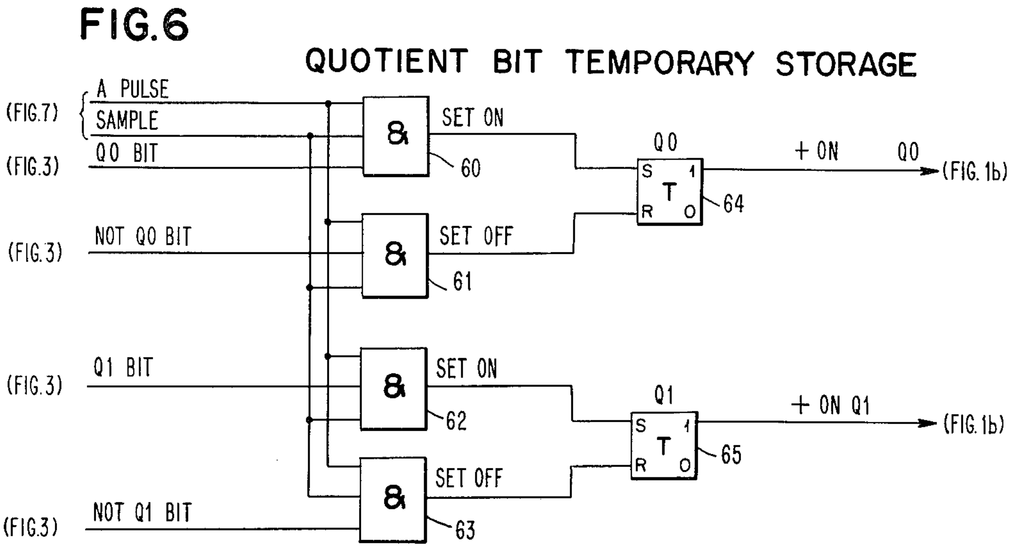

Referring to FIG. 6, the quotient bit temporary storage circuitry will be described. Except for the signals on the timing lines A pulse and sample, the circuitry of FIG. 6 is an extension of the quotient generator of FIG. 3. The selected quotient bits to be developed are stored in triggers 64 and 65 of FIG. 6 upon the coincidence of an A pulse and a sample signal via the AND circuits 60, 61, 62 and 63. Since the adder operates during A pulses the triggers 64 and 65 will be set during adder operation. The outputs of the trigger 64 and 65 will be available during the succeeding B pulse, which shifts the partial dividend register 18 contents, on output lines Q0 and Q1.

The operation of the invention will now be described in detail with special reference to FIG. 9 which shows signals occurring in the circuitry just described. The problem is to divide the decimal dividend 23 (binary 010111.0) by the decimal divisor 49 (binary 110001.0). As previously described, the quotient is the decimal .47 (binary .01111000).

Referring first to FIG. 1*a*, at the occurrence of the first sample pulse from the timing source 7, the cycle counter 8 is set to emit a signal on line *t1*. The memory 1 contains at least three locations, the first of which contains the dividend 010111.0, another one of which contains the divisor 110001.0 and a third one of which remains empty to receive the quotient.

During *t1*, the first cycle of operation, the trigger 71 in FIG. 7 is set on emitting an A pulse to cycle counter 8 which generates, as previously described, a signal *t1* during the entire first cycle of operation. As a result, gate *g12* is operated causing the dividend to be loaded into the memory buffer register 2. The gate *g1* is also operated causing the dividend to be transferred from the memory buffer register to the binary divider 5 partial dividend register 18 via cables 111 and 112. The dividend 010111.0 is loaded into the partial dividend register starting from the highest order so that the highest order (0) bit is placed into the N position, the next highest order (1) bit into the N-1 order, etc.

During *t2*, the second cycle of operation, gate *g12* is operated this time transferring the divisor (which should be normalized, i.e. have no high order leading zeros) to the memory buffer register 2 from the memory 1. The gate *g2* is also operated at this time causing the divisor to be transferred from the memory buffer register 2 to the binary divider 5 register 9 via the cable 110. Thus, the factor one times the divisor (1XD) is stored. The divisor is also at this time transferred from the memory buffer register 2 to the shift register 4, through the adder 3, by operation of the gate *g24*.

During *t3*, the third cycle of operation, the gate *g3* is operated causing the contents (1XD) of the shift register 4 to be shifted left one position. Thus, the divisor in the shift register 4 is doubled causing the second multiple (2XD) to be generated.

During *t4*, the fourth cycle of operation, the 2XD factor is sent to the adder from the shift register 4 via the gate *g4* at the same time that the original divisor (1XD) is again transferred from the memory buffer register 2 to the other input of the adder 3 through gate *g24*. The sum of these factors is three times the divisor (3XD) which is entered into the shift register 4.

During *t5*, the fifth cycle of operation, the factor 3XD is transferred via gate *g5* to the register 10 of the binary divider 5 (FIG. 1*b*) by means of cable 110. At this time the AND circuit 72 in FIG. 7 causes the single shot multivibrator 73 to begin a start cycle, which initiates reduction operations.

During *t6*, the sixth cycle of operation, a start signal is applied to the OR circuit 51 of FIG. 5 by the timing source 7 to set the carry trigger 53 to the off position.

During *t7*, the seventh cycle of operation, the high order 3 bits (010) of the partial dividend register 18 are interrogated by the circuitry of FIG. 2. The high order two significant bits (11) of the (normalized) divisor stored in the register 9 are continuously interrogated by the circuitry of FIG. 2. As a result, the circuit of FIG. 2 emits a signal on line 2X divisor control B which causes the operation of AND gates 11 in FIG. 1*b*. As a result, the factor 2XD is sent through the OR circuits 14 to the complementor 15. Since the carry trigger 53 in FIG. 5 was set off during cycle *t6* the output D will be negative causing the complementor 15 to invert the factor (+2XD) applied at its inputs. The adder 16 generates the sum of this factor (—2XD) and the corresponding orders of the contents of the partial dividend register 18. No carry from the high order *n* of the adder 16 results. Therefore, the carry trigger 53 is set on. Upon the occurrence of this cycle *t7*, there will be an output from AND circuit 40 of FIG. 4 operating AND gate 17 in FIG. 1*b*. The partial dividend register 18 will be updated to contain the new partial dividend (11111010). The coincidence of the sample pulse and a B pulse during the same cycle of operation will cause a signal to emerge from AND circuit 41 in FIG. 4 which operates the PDR shifter 19 of FIG. 1*b*, causing the newly generated partial dividend to be shifted two positions to the left in the partial dividend register 18. At the same time the first two bits (01) of the quotient are entered into the two low order positions of the partial dividend register 18 via the PDR shifter 19.

The quotient bits are generated as shown in FIGS. 3 and 6. The factor chosen was two times the divisor and no adder carry resulted during this reduction operation. Further, since this was the initial reduction operation there was no previous carry from the preceding reduction operation. As a result, there will be an output from AND circuit 31 in FIG. 3 causing a signal from the normal or true output Q0 bit of OR circuit 36 which is applied to set the trigger 64 of FIG. 6 on. Also, there is no output from any of the AND circuits 33, 34 and 35 so that the complement output of the OR circuit 37 in FIG. 3 will have a signal which causes the trigger 65 in FIG. 6 to be set off. It is the outputs from the trigger 64 and 65 which are applied to the two low order positions of the PDR shifter 19 as described above.

During *t8*, the eighth cycle of operation, the highest order 3 bits (111) of the partial dividend register 18 are again examined by the circuitry of FIG. 2 in the same manner as previously described. This time the output line 1X divisor control A will have a signal applied to its causing the operation of AND gates 12 in FIG. 1*b* which gate the factor 1XD from the register 9 through the OR circuits 14 to the input of the complementor 15. Since in FIG. 5 the carry trigger 53 was set on during the previous cycle *t7*, there will be a delayed signal on the gate true output which is applied via the inverter 117 to the complementor 15 in FIG. 1*b*. As a result, the factor +1XD is passed directly through the complementor 15 to the adder 16 without change. This factor is added to the corresponding orders of the partial dividend register which sum replaces the previous contents of these partial dividend register 18 orders upon the occurrence of a sample signal during the A pulse of this cycle. A carry from adder 16 occurs causing the FIG. 5 carry trigger 53 to be set off. During the occurrence of a sample signal during the B pulse of this cycle, the entire contents of the partial register 18 will be shifted through the PDR shifter 19.

Referring to FIGS. 3 and 6, the selection of the 1X divisor factor, the occurrence of a carry during this cycle and the absence of a carry during the previous cycle (FIG. 5 trigger 53 is on) cause an output from the AND circiut 30 which causes a signal on the *Q*0 bit output of OR circuit 36. This signal sets the trigger 64 in FIG. 6 on when the sample signal appears during the A pulse of this cycle. The absence of a carry during the previous cycle as indicated by the on condition of the carry trigger 53 in FIG. 5 causes an output from line 310 of the convert block 38 in FIG. 3. Since, as explained, the 1X divisor factor was selected, there will be an output from AND circuit 33 which is applied to OR circuit 37. The resultant signal on the output line Q1 bit is used to set the trigger 65 in FIG. 6 to the on state. Therefore, two adidtional quotient bits (11) are placed into the low order positions of the partial dividend register 18.

During *t9*, the ninth cycle of operation, the three high order bit positions (011) of the partial dividend register 18 are examined. In FIG. 2, there will be an output on the line 2X divisor control B which causes operation of AND gates 11 to transfer the divisor in register 9 through the OR circuits 14 to the complementor 15 shifted one position to the left. Since the carry trigger 53 in FIG. 5 was set off during the previous cycle, there will be no signal input D to the inverter 117 of FIG. 1*b*. As a result, the input (+2XD) to the complementor 15 will be inverted (—2XD) at the output.

This curent factor is added to the curent contents of the corresponding orders of the partial dividend register 18 in the adder 16 which generates a carry on the output line adder carry. During the coincidence of a sample pulse with the A pulse during this cycle, the AND gate 17 updates the corresponding orders of the partial dividend register with the sum. Referring to the FIG. 5, the occurrence of the adder carry causes the adder trigger 53 to be set off at this time.

During the subsequent B pulse the PDR shifter 19 in FIG. 1*b* is operated by a signal at input F to shift all of the contents in the partial dividend register to the left two positions. The current two bits of the quotient generated by the circuitry of FIGS. 3 and 6 are placed into the partial dividend register 18 at this time. Referring to FIG. 3, the current selection of the factor 2X divisor, the occurrence of an adder carry bit, and a previous carry during the last cycle of operation, cause an output on the line not Q0 bit and on the line Q1 bit. These signals are applied ot the circuitry of FIG. 6 setting the trigger 64 off and the trigger 65 on. The outputs of these triggers are applied to the two low order bit positions to the partial dividend register 18 via the PDR shifter 19 in FIG. 1*b*.

During *t10*, the tenth cycle of operation, the current three highest order bits (000) of the partial dividend register 18 are examined by the circuitry of FIG. 2 which generates a signal on the output 1X divisor control A. This signal is applied to the AND gates 12 in FIG. 1*b* which pass the contents of the register 9 through the OR circuits 14 to the complementor 15 without any change. As was previously mentioned during the last cycle of operation, the carry trigger 53 in FIG. 5 was set off so that there will be no input D to the inverter 117 of FIG. 1*b*. As a result, the factor (+1XD) applied to the inputs of the complementor 15 is inverted (−1XD) at the output of the complementor 15. This factor is added to the corresponding orders of the partial dividend register 18 in the adder 16, no carry resulting as indicated by a signal on the line no adder carry. When a sample signal occurs during the A pulse of this cycle, the result will be entered via the AND gates 17 into the corresponding orders of the partial dividend register 18. At this time, also, the carry trigger 53 in FIG. 5 will be set on. When a sample signal coincides with the B pulse during this cycle of operation, the contents of the partial dividend register 18 will be passed through the PDR shifter 19 and re-entered into the partial dividend register 18 shifted two places to the left. The two lowest order bit positions of the partial dividend register 18 will be set to the two quotient bits (00) developed during this reduction operation.

Referring to FIG. 3, during this cycle of operation the 1X divisor factor was selected and there was no adder carry during the reduction, though there was one during the previous reduction. As a result, the output lines not Q0 bit and not Q1 bit will have signals applied to them causing the triggers 64 and 65 in FIG. 6 to be set off. As a result, two zeros are entered into the low order bit positions of the partial dividend register 18.

When operation has progressed to this point, more reduction cycles may be executed in order to increase the accuracy of the quotient developed. Alternatively, the quotient developed to this point may be used and the contents of the partial dividend register 18 which are not used for the quotient may be used to develop a remainder.

During *tn*, the last cycle of operation, gate *gn* in FIG. 1*a* is operated to transfer the quotient (01111000) from the partial dividend register 18 through the PDR shifter 19 to the memory 1 via cables 113 and 115.

There has been described apparatus for performing binary division wherein two bits of the quotient may be developed during each reduction operation without the necessity of using expensive variable-shift registers or large amounts of extra equipment. In particular, the high order three bits of the current partial dividend and the high order two bits of the divisor are examined to decide which one of three factors of the divisor (1XD, 2XD, 3XD) is to be selected for addition to the current partial dividend. The results of this reduction operation determine what the value of two bits of the quotient is to be. It is obvious that the particular factors chosen, the number of bits of the quotient generated, and the number of shifts taken during a reduction operation are not essential to the invention. By increasing the number, and the value, of the factors and by increasing the number of shifts taken by the fixed-shift register 18 during each reduction operation, the number of quotient bits developed during each reduction may be increased. While the invention has been particularly shown and described with reference to a preferred embodiment thereof, it will be understood by those skilled in the art that the foregoing and other changes in form and details may be made therein without departing from the spirit and scope of the invention.

I claim:

1. Apparatus for developing during repetitive cycles successive bit groups of a binary quotient, from a binary dividend and a binary divisor, including:

factor means for deriving a plurality of factors of the divisor;

control means connected to said factor means operable during each cycle for selecting a factor in accordance with high order bits of the dividend and the divisor;

means connected to said control means operable during each cycle for combining the selected factor and the dividend for generating as a result during each cycle a new dividend equal to the sum, displaced by a plurality of orders, of the selected factor and the dividend generated during the preceding cycle; and means connected to said combining means for generating during each cycle a plurality of bit groups of the quotient.

2. Apparatus for performing binary division in steps, including:

a register operable to initially store a binary dividend and subsequently during successive steps to store binary partial dividends;

means connected to said register operable to shift the stored quantity a fixed number of binary orders during each step;

source means for supplying a plurality of multiples of a binary divisor;

selection means connected to said source and to said register operable to select, for each step, a divisor multiple in accordance with the binary value of preselected orders of the divisor and the dividend initially and the divisor and the partial dividend during subsequent steps;

an adder connected to said selection means and to said register operable, during each step, to replace the quantity stored in the register with the sum of the divisor selected for the step and the quantity stored;

quotient generation means, connected to the adder and to the source operable during each step to develop a fixed number of bits, equal to said fixed number of shifts, in accordance with said preselected orders of said divisor and initially said dividend or subsequently said partial dividend, and said sum; and control means for making said selection means, adder, shifting means and quotient generation means operative once during each step.

3. In combination:

a source of a number of plural order binary divisor factors;

means for initially storing a plural order binary dividend;

means connected to said storing means for examining a plurality of orders of said dividend;

selecting means connected to said source and to said examining means for selecting one of said number of divisor factors;

combinatorial means connected to said selecting means and to said storing means operable to arithmetically combine corresponding orders of said selected divisor factor and said storing means contents, the combination replacing the storing means contents;

means connected to said combinatorial means for generating a fixed plurality of quotient bits as a function of the selected factor and the combination operation; and means connected to said storing means for shifting the contents of a fixed plurality of orders equal to said fixed plurality of quotient bits.

4. Apparatus for performing binary division upon a plural-order dividend and divisor in parallel during successive reduction operations including:

shifting register means, having plural orders for holding during a first reduction operation corresponding orders of the dividend and for holding during subsequent reduction operations, in positions displaced by two orders after each reduction operation, orders of a partial dividend;

a source of the orders of the divisor and of second and third multiples of the divisor;

selection means connected to said source for selecting before each reduction operation the divisor or one of its multiples in accordance with the three high order bits held in the shifting register and the two high order bits, starting with the first significant order, of the divisor;

combination means for generating during each reduction operation a partial dividend in accordance with the previously selected divisor or divisor multiple and the contents of the shifting register during the reduction operation; and means for generating two bits of a quotient after each reduction operation in accordance with the divisor multiple selected and the partial dividend generated.

5. In combination:

a first plural order register;

means connected to said first register for initially entering the orders of a binary dividend into corresponding orders of said first register;

a second plural order register;

means connected to said second register operable to enter the orders of a binary divisor into corresponding orders of said second register;

a third register;

means connected to said third register operable to enter the orders of a third multiple of the binary divisor into corresponding orders of said third register;

an adder having a first plural order of inputs, a second plural order set of inputs and a plural order set of outputs, for generating at the outputs the order of a sum of the inputs and an indication of the presence of a carry from the highest order;

first gate means connected to said second register and to said first set of adder inputs operable to transfer the divisor from orders of said second register to corresponding orders of said first set of adder inputs;

second gate means connected to said second register and to said first set of adder inputs operable to transfer the divisor from orders of said second register to orders adjacent to corresponding orders of said first set of adder inputs;

third gate means connected to said third register and to said first set of adder inputs operable to transfer the third multiple of the divisor from orders of said third register to corresponding orders of said first set of adder inputs;

fourth gate means connected to the first register and the second set of adder inputs operable to transfer the contents of orders of the first register to corresponding orders of the second set of adder inputs;

fifth gate means connected to the adder outputs and the first register, operable to transfer the orders of the adder sum outputs to corresponding orders of the first register;

shifting means connected to said first register operable to transfer the orders of the first register contents to orders two orders removed from the order from which the contents are removed;

control means connected to the three highest order positions of the first register, the two highest order positions of the second register and the carry output of the adder, for generating control signals;

first routing means connected to said control means and said first, second, third and fourth gate means for causing one of said gate means to be operable in cycles in accordance with said control signals, to supply one divisor or divisor multiple to said first set of adder inputs and the first register contents to said second set of adder inputs;

second routing means connected to said fifth gating means and said shifting means for causing after each said cycle said sum to be first transferred to said first register and then said first register contents to be shifted; and quotent generation means connected to said control means, operated in response to said control signals for developing two orders of a quotient after each cycle.

References Cited by the Examiner

Pages 169–174, June 1961, "Reducing Computing Timing for Synchronous Binary Division," R. G. Saltman, I.R.E. Transactions on Electronic Computers, volume E.C.–10.

ROBERT C. BAILEY, *Primary Examiner.*

DARYL W. COOK, *Examiner.*